(12) United States Patent
Grelaud et al.

(10) Patent No.: US 11,267,449 B2
(45) Date of Patent: Mar. 8, 2022

(54) MOTORCYCLE AND METHOD AND CONTROL UNIT FOR CONTROLLING AN ACTIVE STEERING INFLUENCE SYSTEM OF A MOTORCYCLE

(71) Applicant: Robert Bosch GmbH, Stuttgart (DE)

(72) Inventors: Mathieu Grelaud, Ludwigsburg (DE); Michael Schoenherr, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 16/521,231

(22) Filed: Jul. 24, 2019

(65) Prior Publication Data
US 2020/0047739 A1    Feb. 13, 2020

(30) Foreign Application Priority Data

Aug. 8, 2018  (DE) .......................... 102018213298.4

(51) Int. Cl.
*B60W 10/20* (2006.01)
*B62K 21/08* (2006.01)
(Continued)

(52) U.S. Cl.
CPC ............ *B60W 10/20* (2013.01); *B60W 10/18* (2013.01); *B60W 30/09* (2013.01); *B60W 30/14* (2013.01);
(Continued)

(58) Field of Classification Search
CPC ...... B60W 10/20; B60W 30/09; B60W 30/14; B60W 10/18; B60W 2300/36;
(Continued)

(56) References Cited

U.S. PATENT DOCUMENTS

| 2002/0157909 A1* | 10/2002 | Hasegawa | ............... | B62K 21/08 |
| | | | | 188/290 |
| 2009/0088918 A1* | 4/2009 | Takenaka | ............... | B62D 6/003 |
| | | | | 701/31.4 |

(Continued)

FOREIGN PATENT DOCUMENTS

| DE | 102007049353 A1 | 4/2009 |
| DE | 102011082413 A1 | 3/2013 |

*Primary Examiner* — Richard M Camby
(74) *Attorney, Agent, or Firm* — Norton Rose Fulbright US LLP; Gerard Messina

(57) ABSTRACT

A motorcycle, including method and control unit for controlling an active steering influence system, which is for actively influencing steering motions on a front wheel. A driver assistance system is for effectuating, with control instructions to components of the motorcycle, longitudinal accelerations. The driver assistance and active steering influence systems are for a signal communication with each other, e.g., via lines. The driver assistance system is for outputting, before/while outputting a control instruction, a signal instruction to the active steering influence system so that the active steering influence system, via an active modification of its state, counters a change of a movement direction, which is associated with the longitudinal acceleration to be effectuated with the control instruction. Accordingly, driving comfort or safety while riding is improve-able, in that, for example, fishtailing or wobbling motions, which are unexpected and are initiated by interventions of driver assistance system, are largely prevented.

15 Claims, 1 Drawing Sheet

(51) Int. Cl.
  *B60W 30/09* (2012.01)
  *B60W 30/14* (2006.01)
  *B60W 10/18* (2012.01)
  *B62J 99/00* (2020.01)
  *B62J 45/20* (2020.01)
  *B62J 45/40* (2020.01)

(52) U.S. Cl.
  CPC ............... *B62J 99/00* (2013.01); *B62K 21/08* (2013.01); *B60W 2300/36* (2013.01); *B60W 2520/105* (2013.01); *B60W 2710/18* (2013.01); *B60W 2710/20* (2013.01); *B62J 45/20* (2020.02); *B62J 45/40* (2020.02)

(58) Field of Classification Search
  CPC ......... B60W 2710/18; B60W 2710/20; B60W 2520/105; B60W 10/22; B62K 21/08; B62J 99/00; B62J 45/20; B62J 45/40
  See application file for complete search history.

(56) References Cited

U.S. PATENT DOCUMENTS

| | | | |
|---|---|---|---|
| 2009/0139793 A1* | 6/2009 | Suzuki | B62K 21/00 180/446 |
| 2009/0222164 A1* | 9/2009 | Seiniger | B60T 8/172 701/36 |
| 2014/0249720 A1* | 9/2014 | Sintorn | B62D 1/02 701/41 |

* cited by examiner

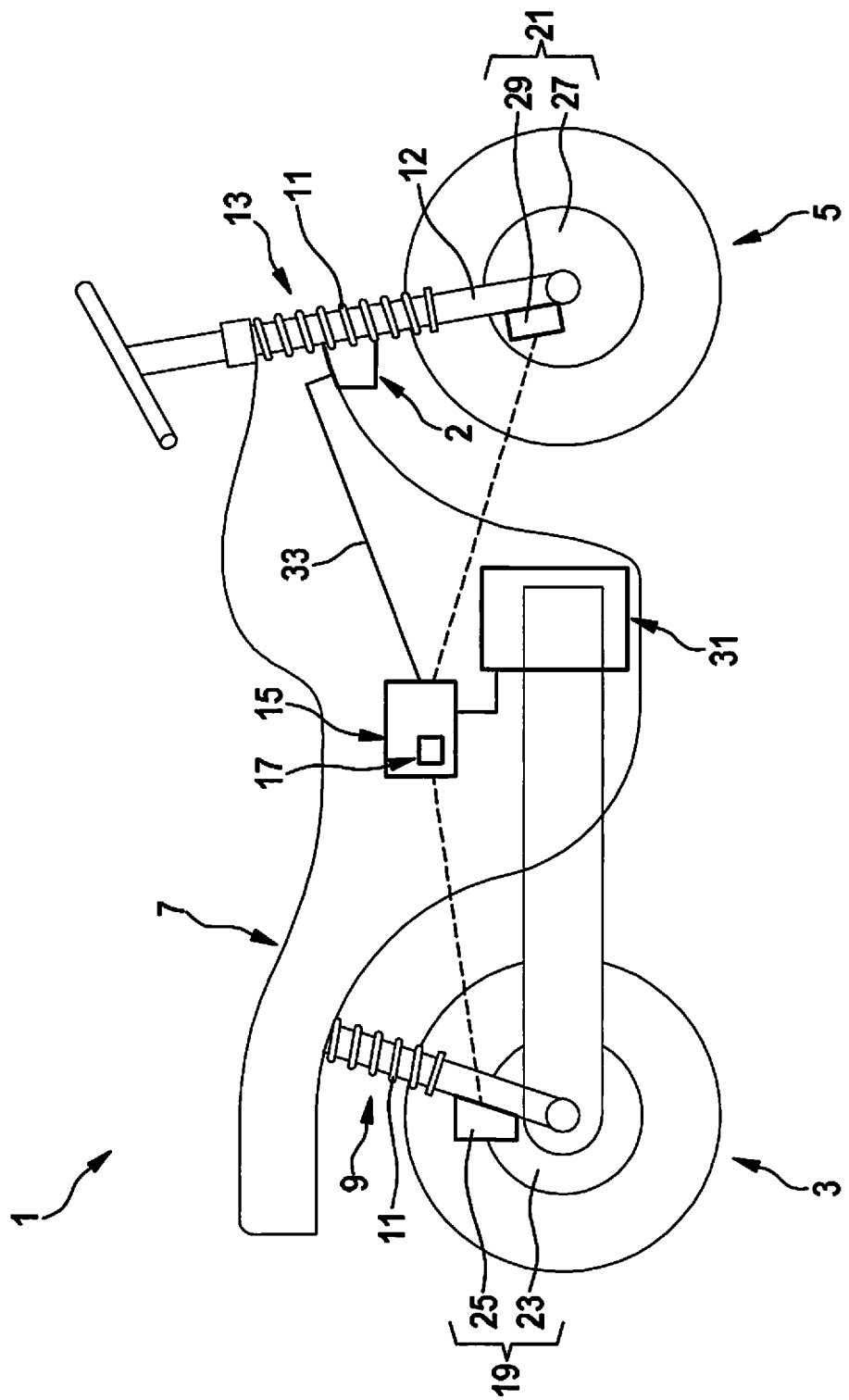

MOTORCYCLE AND METHOD AND CONTROL UNIT FOR CONTROLLING AN ACTIVE STEERING INFLUENCE SYSTEM OF A MOTORCYCLE

RELATED APPLICATION INFORMATION

The present application claims priority to and the benefit of German patent application no. 10 2018 213 298.4, which was filed in Germany on Aug. 8, 2018, the disclosure of which is incorporated herein by reference.

FIELD OF THE INVENTION

The present invention relates to a motorcycle. In particular, the present invention relates to a motorcycle including an active steering influence system which is controlled in a specific way.

BACKGROUND INFORMATION

Motorcycles, as mostly single-track, two-wheeled vehicles, have vehicle dynamics which encompass more degrees of freedom as compared to two-track, multi-wheeled vehicles, such as automobiles, and, therefore, are more challenging to control.

Motorcycles which include an active steering influence system are known. With the aid of the active steering influence system, steering motions on a front wheel of the motorcycle may be actively influenced. In particular, relative motions between the front wheel and a frame of the motorcycle may be actively modified during a steering of the motorcycle, in that these relative motions may be damped and/or acted upon with force in a modifiable way with the aid of the active steering influence system. The steering influence system may therefore be configured as an active steering damper or as an active steering assistance system.

Patent document DE 10 2007 049353 A1 discusses an electronically activatable damping device for vehicle steering, in particular for a motorcycle.

Patent document DE 10 2011 082 413 A1 discusses a steering assistance system for a two-wheeler as well as a controller for such a steering assistance system.

With respect to automobiles, various driver assistance systems are known, which assist a driver during the steering of the vehicle and/or automatically activate vehicle components in order to influence vehicle dynamics of the vehicle. For example, the brakes of the vehicle, as vehicle components, may be activated in an automated manner, in a suitable way, in order to be able to carry out braking operations in a way which is optimized and adapted to previously detected driving situations. Moreover, the drive of the vehicle, as a vehicle component, may be suitably activated in an automated way in order to adapt a speed of the vehicle to certain driving situations.

Efforts are made to utilize driver assistance systems in motorcycles as well.

SUMMARY OF THE INVENTION

Against this background, the approach presented here provides a motorcycle as well as a method and a control unit for controlling an active steering influence system of a motorcycle as recited in the independent claims. Advantageous refinements and improvements of the approach presented here result from the description and/or are described in the dependent claims.

Specific embodiments of the present invention may make it possible, in an advantageous way, to configure vehicle dynamics of a motorcycle to be safer and/or more comfortable for a rider.

According to a first aspect of the present invention, a motorcycle is provided, which includes an active steering influence system, with the aid of which steering motions on a front wheel of the motorcycle are actively influenceable. The motorcycle is distinguished by the fact that it further includes a driver assistance system which is configured for effectuating longitudinal accelerations of the motorcycle with the aid of control instructions for components of the motorcycle, and that the driver assistance system and the active steering influence system are configured for carrying out signal communication with each other, and the driver assistance system is configured for outputting a signal instruction to the active steering influence system, before and/or during an output of a control instruction, in such a way that the active steering influence system, via an active modification of its state, counters a change of a movement direction of the motorcycle, which is associated with the longitudinal acceleration to be effectuated with the aid of the control instruction.

According to a second aspect of the present invention, a method for controlling an active steering influence system of a motorcycle is provided. The motorcycle includes a driver assistance system in this case. The driver assistance system and the active steering influence system are configured for carrying out signal communication with each other. The method encompasses (i) detecting that the driver assistance system plans to output or is instantaneously outputting a control instruction in order to effectuate a longitudinal acceleration of the motorcycle, and (ii) in response thereto, outputting a signal instruction to the active steering influence system in such a way that the active steering influence system, via an active modification of its state, counters a change of a movement direction of the motorcycle, which is associated with the longitudinal acceleration to be effectuated with the aid of the control instruction.

A third aspect of the present invention relates to a control unit for controlling an active steering influence system of a motorcycle, the control unit being configured for carrying out or controlling a method according to a specific embodiment of the second aspect of the present invention.

Ideas regarding specific embodiments of the present invention may be considered, inter alia, as being based on the ideas and findings described in the following.

As mentioned at the outset, many motorcycles already include an active steering influence system. Such an active steering influence system may be configured for actively influencing motions of a wheel suspension of the front wheel of the motorcycle, in that forces are effectuated between the wheel suspension and a frame of the motorcycle. Alternatively or additionally, such an active steering influence system may be configured for damping motions of the wheel suspension of the front wheel of the motorcycle in relation to the frame of the motorcycle, where damping properties may be actively varied.

For example, a characteristic curve of a turn-in motion of the front wheel of the motorcycle, as it is influenced by the steering influence system may be actively temporarily modifiable in order to enable the front wheel to be turned in more gently or less gently, whichever is appropriate to the situation, or to actively assist a turn-in of the front wheel with the aid of a targeted application of force. Additionally or alternatively, a characteristic curve of a steering damping at the front wheel may be actively temporarily modifiable in order to be able to dampen turn-in motions of the front wheel in a way which is appropriate to the situation. As a result, the active steering influence system may influence turn-in motions of the front wheel of the motorcycle. Turn-in motions may be understood, in this case, to be relative motions in the horizontal direction, between the front wheel of the motorcycle on the one hand and a center of gravity of the motorcycle or a frame of the motorcycle on the other hand. Such turn-in motions are essentially associated with a rotation of the front wheel and the front wheel suspension about a vertical axis. As a result, in particular, a steering behavior of the motorcycle, but also unintended motions of the motorcycle, in particular about a vertical rotational axis, such as a fishtailing or wobbling of the motorcycle, may be influenced.

An active steering influence system may encompass, in this case, one or multiple actuators which actively partially or completely effectuate the forces which are otherwise passively effectuated, for example, via restoring forces on a steering of the motorcycle as they are effectuated, for example, by a caster of the front wheel and/or by a spring, and/or via a damper of a passive steering influence system. If necessary, a turn-in path and/or a deflection of the steering influence system may also be actively influenced in the case of a certain force acting on the steering influence system. Moreover, a relative motion between the front wheel suspension and the frame of the motorcycle may be damped with the aid of the active steering influence system in a way which is varied in a targeted manner. The active steering influence system requires an energy supply for this purpose. For example, the active steering influence system may be operated hydraulically and/or electrically.

In one specific embodiment, the active steering influence system, as an active steering damper, may be configured for damping steering motions occurring between a front wheel suspension and a frame of the motorcycle in an actively controllable way. In the case of such an active or semi-active damping, damper elements between the frame and the front wheel suspension of the motorcycle may be switched between various characteristic curves. Such active or semi-active dampings may be configured, for example, to include a hydractive suspension and/or as magnetorheological dampers. Semi-active dampings may be used, in particular, for a utilization in motorcycles, since, as compared to many other technical implementations of active steering influence systems, they are mostly less complex, are more easily activated, and/or have a lower weight.

In an alternative or supplemental embodiment, the active steering influence system, as an active steering assistance system, may be configured for actively assisting relative motions between the front wheel suspension and the frame of the motorcycle. For this purpose, the steering influence system may encompass actuators, with the aid of which forces or torques onto the front wheel suspension may be effectuated, with the aid of which steering motions of the front wheel may be effectuated or at least assisted. If necessary, forces or torques may also be effectuated in such a way that they counter steering motions of the front wheel in a targeted manner.

Moreover, an aim is to influence vehicle dynamics of a motorcycle in an automated manner with the aid of a driver assistance system. The driver assistance system may activate components of the motorcycle in this case, which influence the vehicle dynamics or a driving condition of the motorcycle. Such components may be, for example, brakes on the front wheel and/or on the rear wheel of the motorcycle. Other components, such as a drive motor which propels the motorcycle, a clutch, an automatic transmission, or the like, may also be controlled by the driver assistance system. Generally speaking, the driver assistance system is utilized for effectuating longitudinal accelerations, i.e., decelerating the motorcycle or increasing its speed, with the aid of a partially or completely automated activation of the aforementioned components of the motorcycle.

The driver assistance system may implement various functions in this case. For example, the driver assistance system may form an adaptive cruise control, a pre-collision brake assist, and/or an automatic emergency braking system. In this case, an adaptive cruise control (ACC) may control a present speed of the motorcycle in a manner adapted to driving situations by suitably influencing, in an automated manner, a power output of the engine and/or an activity of the deceleration of the motorcycle. For example, the speed may be temporarily reduced in order to ensure that a distance to a preceding vehicle does not decrease to such an extent that it becomes unsafe. A pre-collision brake assist (PBA) may activate or at least pre-activate, in an automated manner, brakes of the motorcycle upon detection of an imminent collision in order to be able to shorten a braking distance, for example, in the event of a subsequent full application of the brakes. An automatic emergency braking system, upon detection of an emergency, may activate the brakes of the motorcycle in such a way, for example, that a full application of the brakes decelerates the motorcycle with maximum effectiveness.

It has been found, however, that motorcycles, for example, as compared to automobiles, have a much more dynamic geometry and/or a more dynamic driving behavior. In particular, it has been found that comfort for the rider or even the safety could be endangered when a driver assistance system excessively intervenes in the subtle balance which must be maintained with respect to the vehicle dynamics of a motorcycle.

For example, a sudden brake application on the front wheel of the motorcycle may cause its wheel suspension to plunge, i.e., the motorcycle tilts forward. A strong acceleration of the motorcycle or, to a lesser extent, a brake application on the rear wheel of the motorcycle may cause the motorcycle to tilt rearward or to lift upward with the front wheel. Both motions may effectuate a weight displacement which may endanger the comfort and, in extreme situations, even the safety while riding the motorcycle.

It has therefore been found that, although it is desirable, on the one hand, to also equip motorcycles with driver assistance systems, these driver assistant systems should intervene in the vehicle dynamics of the motorcycle only in such a way that no negative consequences result for the driving comfort and safety of the motorcycle.

In order to achieve this, it is provided to configure the driver assistance system and the active steering influence system of the motorcycle in such a way that they may communicate with each other by exchanging signals. In particular, the driver assistance system is to be able to transmit signals to the active steering influence system and, therefore, to control the steering influence system. For this purpose, the active steering influence system and the driver assistance system may be fixedly wired to one another, for example. Via the fixed wiring, control signals from the driver assistance system may be reliably transmitted to the active steering influence system. Alternatively, other forms of a signal communication, in particular a wireless signal communication, between the driver assistance system and the active steering influence system may be set up.

The driver assistance system or a control unit implementing this driver assistance system is to now no longer generate only the control instructions, with the aid of which the longitudinal accelerations of the motorcycle are effectuated, but, in addition thereto, to also generate further control instructions which are referred to herein as signal instructions, with the aid of which the active steering influence system is activated in a targeted manner. In this case, the active steering influence system is to be activated with the aid of the signal instructions in such a way that an instantaneous state of the active signal influence system is modified in a predetermined way in order to thereby counter vertical motions which are predictably associated with the longitudinal accelerations to be effectuated by the control instructions.

In other words, it is largely known, for example, on the basis of tests or simulations, how the motorcycle behaves, in particular how the motorcycle pitches forward or rearward when it is decelerated or accelerated with the aid of an intervention effectuated by the driver assistance system. A change of the movement direction of the motorcycle associated therewith or effectuated as a result is to be actively countered, in that the active steering influence system is suitably activated.

The activation of the active steering influence system may already take place, in this case, before the driver assistance system activates the longitudinal acceleration of the motorcycle by outputting the control signals. Alternatively or additionally, the active steering influence system may also be suitably activated while the driver assistance system activates the longitudinal acceleration of the motorcycle by outputting the control signals.

In particular, the driver assistance system may be configured for outputting the signal instruction to the active steering influence system in such a way that the active steering influence system essentially neutralizes the changes of the movement direction of the motorcycle, which are associated with the longitudinal acceleration to be effectuated with the aid of the control instruction.

In other words, the capability of the active steering influence system to be able to actively manipulate damping properties of and/or applications of force by components of the steering influence system, etc., may be utilized for countering the changes of the movement direction of the motorcycle, which often occur when the motorcycle is strongly decelerated or accelerated in the longitudinal direction. In this case, the instantaneous properties of the active steering influence system may be temporarily modified via an activation in a targeted manner, i.e., by transmitting suitable signal instructions from the driver assistance system, in such a way that, despite effectuated longitudinal accelerations, essentially no changes of the movement direction of the motorcycle are effectuated.

In this context, "essentially" may be understood to mean that at least no excessive changes of the movement direction, i.e., no changes of the movement direction, which negatively influence the driving comfort or even the safety while riding the motorcycle, are effectuated. The extent to which a compensation of changes of the movement direction is to be considered to be an "essential neutralization" thereof may therefore depend on various factors, for example, on a prevailing driving situation, on physical properties of the motorcycle, and/or on habits or desires of a rider. For example, an "essential neutralization" of changes of the movement direction may be assumed when the changes make up less than 30%, which may be less than 10% of the changes of the movement direction, which would occur if no countermeasures were taken by actively actuating the active steering influence system.

In one specific embodiment, the driver assistance system may be configured for effectuating, with the aid of the control instruction, a brake application at the front wheel and/or at the rear wheel and for outputting the signal instruction in such a way that the active steering influence system is modified to an extent and/or in a way which correlates with an intensity and/or a type of the deceleration. Situations in which the driver assistance system activates a brake application on the motorcycle are predestined for effectuating changes of the movement direction, in particular a fishtailing or wobbling of the motorcycle due to turn-in, in particular an oscillating turn-in of the front wheel of the motorcycle, which are negative for the comfort or the safety of the motorcycle. Depending on the type and/or extent of the intervention effectuated by the driver assistance system, i.e., depending on which of the wheels of the motorcycle is decelerated and/or how intensively the particular wheel is decelerated, different changes of the movement direction are to be expected. It therefore may be that the driver assistance system, with the aid of its signal instructions, manipulates the active steering influence system in a way which correlates with the intensity and/or type of deceleration which is also controlled by the driver assistance system.

When, for example, one of the wheels of the vehicle is decelerated with the aid of the driver assistance system, the motorcycle would more or less strongly tend to change its movement direction depending on how hard the brakes are applied if no suitable countermeasures are implemented. The driver assistance system should accordingly modify the instantaneous state of the active steering influence system to different extents depending on the intensity of the deceleration to be effectuated.

A correlation between the intensity of the deceleration and the extent of the intervention effectuated by the driver assistance system into the active steering influence system may be, for example, proportional, in particular directly proportional, possibly also overproportional or underproportional. In addition, the driver assistance system should possibly take into account which of the wheels of the motorcycle is decelerated or is decelerated to a greater extent than the other wheel in order to be able to draw conclusions, on the basis of this type of deceleration, regarding the change of the movement direction to be expected and to then be able to counter the change of the movement direction by actuating the active steering influence system in a targeted manner.

It is pointed out that some of the possible features and advantages of the present invention are described herein with reference to different specific embodiments related to a motorcycle according to the present invention, relating to a method according to the present invention, or relating to a control unit according to the present invention. Those skilled in the art recognize that the features may be combined, transferred, adapted, or replaced in a suitable way in order to arrive at further specific embodiments of the present invention.

Specific embodiments of the present invention are described in the following with reference to the attached drawing, where neither the drawing nor the description are to be considered as limiting the present invention.

The FIGURE is merely schematic and is not true to scale.

BRIEF DESCRIPTION OF THE DRAWING

FIG. 1 shows a motorcycle according to a specific embodiment of the present invention.

DETAILED DESCRIPTION

FIG. 1 shows a motorcycle 1 according to a specific embodiment of the present invention. Motorcycle 1 includes a rear wheel 3, a front wheel 5, and a frame 7. Rear wheel 3 is mounted on frame 7 with the aid of a rear wheel suspension 9. A suspension 11 allows for vertical movements of rear wheel 3 in relation to frame 7. Front wheel 5 is mounted on frame 7 with the aid of a front wheel suspension 13, an axle of front wheel 5 being held in a fork 12. In this case as well, a suspension 11 allows for vertical movements of the front wheel in relation to the frame. Moreover, front wheel suspension 13 may be pivoted or rotated in relation to frame 7 in a horizontal plane of motion about an essentially vertical rotational axis. Such a pivoting or rotation of front wheel suspension 13 in relation to frame 7 is also referred to as a steering motion, since this is generally associated with a change of a movement direction of motorcycle 1.

Moreover, motorcycle 1 includes an active steering influence system 2, with the aid of which steering motions on a front wheel 5 may be influenced.

For this purpose, active steering influence system 2 may encompass one or multiple actuators, with the aid of which forces may be effectuated between frame 7 and front wheel suspension 13. The forces may be effectuated in such a way that steering motions may be effectuated, assisted, or even countered, if necessary, at front wheel 5.

Alternatively or additionally, active steering influence system 2 may also encompass actively controllable damping units, with the aid of which steering motions may be damped at front wheel suspension 13 in a targeted and variable manner. For this purpose, for example, a spring-damper system may be provided between frame 7 and front wheel suspension 13 in order to be able to apply forces onto front wheel suspension 13 while steering motions take place, which have a damping effect and may counter these steering motions with the aid of a controllable force.

Moreover, motorcycle 1 includes a driver assistance system 17 which is implemented, for example, as part of a control unit 15. Control unit 15 may control the function of a brake system encompassing a brake 19 on rear wheel 3 and encompassing a brake 21 on front wheel 5 via suitable communication paths (indicated in the FIGURE merely with the aid of dashed lines, for the sake of clarity). A brake disk 23, which may be decelerated with the aid of a controllable brake caliper 25, is provided on rear wheel 3 in this case. A brake disk 27, which may be decelerated with the aid of a brake caliper 29, is provided on front wheel 5. Depending on the driving situation, control unit 15 may activate one or both brakes 19, 21 with the aid of control instructions generated by driver assistance system 17 and, as a result, effectuate a longitudinal acceleration of motorcycle 1 in the form of a deceleration.

In addition, control unit 15 is connected to a drive motor 31 of motorcycle 1 via a suitable communication path. By way of the transmission of suitable control instructions in accordance with driver assistance system 17, a power output of drive motor 31 may be controlled and, therefore, longitudinal accelerations of motorcycle 1 may also be effectuated.

Control unit 15 and, therefore, driver assistance system 17 as well, may also transmit signal instructions to steering influence system 2. For this purpose, control unit 15 is fixedly wired to steering influence system 2 via one or multiple electrical lines 33.

According to the present invention, control unit 15 is specifically configured for carrying out a method for controlling active steering influence system 2 of motorcycle 1. In this case, it is detected that driver assistance system 17 plans to output a control instruction or is presently outputting such a control instruction, with the aid of which a longitudinal acceleration of motorcycle 1 is to be effectuated. When this is detected, i.e., shortly before or during transmission of such a control signal, for example, to one of brakes 19, 21 or to drive motor 31, control unit 15 outputs a suitable signal instruction to steering influence system 2. In this case, the signal instruction prompts active steering influence system 2 to modify its present state in such a way that an expected change of a present movement direction of motorcycle 1, which is associated with the longitudinal acceleration to be effectuated with the aid of the control instruction, is countered and, in the ideal case, is essentially neutralized.

When driver assistance system 17 implements, for example, the function of a pre-collision brake assist or an automatic emergency braking system, driver assistance system 17 may activate, for example, one or both brakes 19, 21 as soon as the risk of a collision or the occurrence of an emergency situation is detected. Since an abrupt deceleration of motorcycle 1, as expected, is typically not only associated with a pitching forward, i.e., with a deep plunge of front wheel suspension 13, but may also result in a fishtailing, a wobble, or similar oscillating changes of the movement direction of motorcycle 1, control unit 31 may counter this expected change of the movement direction in a targeted manner.

For this purpose, control unit 15 may prompt, with the aid of a signal instruction, for example, steering influence system 2 to temporarily more intensively preload the damping of steering motions effectuated with the aid of steering influence system 2, or to configure the damping properties of steering influence system 2 to be more pronounced. A way in which the damping properties of particular steering influence system 2 are modified may be selected, in this case, depending on a type and/or an extent of the longitudinal acceleration to be effectuated by driver assistance system 17. Alternatively or additionally, control unit 15 may prompt steering influence system 2, with the aid of signal instructions, to actively counter any occurring and apparently unintentional changes of the movement direction of motorcycle 1, in that forces are generated onto front wheel suspension 13 with the aid of actuators in order to effectuate suitable counter-steering motions.

In an alternative example, driver assistance system 17 may implement, for example, the function of an adaptive cruise control. In this case, for example, a situation may occur, in which the speed of motorcycle 1 is to be increased and, with the aid of driver assistance system 17, control unit 15 prompts drive motor 31 to initiate a stronger power output. Predictably, this generally results in front wheel 5 being temporarily unloaded and rear wheel 3 being loaded, so that motorcycle 1 briefly pitches rearward. In particular, the unloading of front wheel 5 may result in motorcycle 1 fishtailing. In order to counter such fishtailing motions, control unit 15, shortly before or while it initiates the power increase at drive motor 31, may temporarily prompt steering influence system 2, for example, to intensify the damping effectuated on front wheel suspension 13 and/or to effectuate counter-steering motions by actively applying forces in order to actively counter the fishtailing motions.

With the aid of the approach provided herein, an increase of the driving safety and/or an improvement of the driving conditions or the driving comfort of motorcycle 1 may be effectuated with relatively simple technical arrangements and by utilizing components which may be provided in a motorcycle 1 anyway, such as active steering influence system 2 and control unit 15 equipped with driver assistance system 17. In particular, driving comfort or safety while riding motorcycle 1 may be improved, in that, for example, changes of the movement direction of motorcycle 1, which are unexpected by the driver and are initiated by interventions of driver assistance system 17, are largely prevented or at least greatly reduced.

Provided the aforementioned components are already provided in motorcycle 1, it may suffice to allow these components to communicate with each other, i.e., the only additional hardware which may need to be provided is a wiring, for example, in the form of lines 33 between control unit 15 and steering influence system 2. The carrying-out of the aforementioned method may be achieved simply by implementing an appropriate software or with the aid of a mixed software/hardware approach.

Finally, it should be noted that terms such as "including", "encompassing", etc., do not exclude other elements or steps and terms such as "a" or "an" do not exclude a plurality. Reference numerals in the claims are not to be considered to be a limitation.

What is claimed is:

1. A motorcycle, comprising:
    an active steering influence system to actively influence steering motions on a front wheel of the motorcycle;
    a driver assistance system to effectuate, by providing a control instruction to a component of the motorcycle, a longitudinal acceleration of the motorcycle;
    wherein the driver assistance system is configured to communicate, before and/or during the provision of the control instruction, a signal instruction to the active steering influence system that causes the active steering influence system to counter, via an active modification of a state of the active steering influence system, a change of a movement direction of the motorcycle that is to occur due to the longitudinal acceleration to be effectuated by the provision of the control instruction; and
    wherein at least one of the following three features (a)-(c) is present:
        (a) the longitudinal acceleration is effectuated by a brake application at the front wheel and/or at a rear wheel of the motorcycle, and the active modification of the state of the active steering influence system caused by the signal instruction is to an extent and/or in a way that correlates with an intensity and/or a type of the deceleration;
        (b) the active steering influence system, as an active steering damper, is configured for variably influencing damping properties with respect to a relative motion between a wheel suspension of the front wheel and a frame of the motorcycle; and
        (c) the driver assistance system implements at least one of the following functions: an adaptive cruise control, a pre-collision brake assist, and an automatic emergency braking system.

2. The motorcycle of claim 1, wherein the driver assistance system is configured for outputting the signal instruction to the active steering influence system so that the active steering influence system essentially neutralizes the change of the movement direction of the motorcycle that is to occur due to the longitudinal acceleration to be effectuated by the provision of the control instruction.

3. The motorcycle of claim 1, wherein the longitudinal acceleration is effectuated by the brake application at the front wheel and/or at the rear wheel, and the active modification of the state of the active steering influence system caused by the signal instruction is to the extent and/or in the way that correlates with the intensity and/or the type of the deceleration.

4. The motorcycle of claim 1, wherein the active steering influence system and the driver assistance system are fixedly wired for the communication of the signal instruction.

5. The motorcycle of claim 1, wherein the active steering influence system, as the active steering damper, is configured for variably influencing the damping properties with respect to the relative motion between the wheel suspension of the front wheel and the frame of the motorcycle.

6. The motorcycle of claim 1, wherein the active steering influence system, as an active steering assistance system, is configured for actively assisting a relative motion between a wheel suspension of the front wheel and a frame of the motorcycle.

7. The motorcycle of claim 1, wherein the driver assistance system implements at least one of the adaptive cruise control, the pre-collision brake assist, and the automatic emergency braking system.

8. A method for controlling an active steering influence system of a motorcycle that includes the active steering influence system and a driver assistance system, the method comprising:
    before and/or during, and due to, an output, by the driver assistance system, of a control instruction to a component of the motorcycle to cause the component to effectuate a longitudinal acceleration of the motorcycle, the driver assistance system communicating a signal instruction to the active steering influence system that causes the active steering influence system to counter, via an active modification of a state of the active steering influence system, a change of a movement direction of the motorcycle that is to occur due to the longitudinal acceleration to be effectuated by the provision of the control instruction;
    wherein at least one of the following three features (a)-(c) is present:
        (a) the longitudinal acceleration is effectuated by a brake application at a front wheel of the motorcycle and/or at a rear wheel of the motorcycle, and the active modification of the state of the active steering influence system caused by the signal instruction is to an extent and/or in a way that correlates with an intensity and/or a type of the deceleration;
        (b) the active steering influence system, as an active steering damper, is configured for variably influencing damping properties with respect to a relative motion between a wheel suspension of the front wheel and a frame of the motorcycle; and
        (c) the driver assistance system implements at least one of the following functions: an adaptive cruise control, a pre-collision brake assist, and an automatic emergency braking system.

9. A control unit of a motorcycle that includes an active steering influence system and a driver assistance system, the control unit comprising a processor that is configured to perform a method, the method comprising:

determining that the driver assistance system is providing a control instruction to a component of the motorcycle to cause the component to effectuate a longitudinal acceleration of the motorcycle;

in response to the determination, communicating, before and/or during the provision of the control instruction, a signal instruction to the active steering influence system that causes the active steering influence system to counter, via an active modification of a state of the active steering influence system, a change of a movement direction of the motorcycle that is to occur due to the longitudinal acceleration to be effectuated by the provision of the control instruction;

wherein at least one of the following three features (a)-(c) is present:
  (a) the longitudinal acceleration is effectuated by a brake application at a front wheel of the motorcycle and/or at a rear wheel of the motorcycle, and the active modification of the state of the active steering influence system caused by the signal instruction is to an extent and/or in a way that correlates with an intensity and/or a type of the deceleration;
  (b) the active steering influence system, as an active steering damper, is configured for variably influencing damping properties with respect to a relative motion between a wheel suspension of the front wheel and a frame of the motorcycle; and
  (c) the driver assistance system implements at least one of the following functions: an adaptive cruise control, a pre-collision brake assist, and an automatic emergency braking system.

10. The control unit of claim 9, wherein the longitudinal acceleration is effectuated by the brake application at the front wheel and/or at the rear wheel, and the active modification of the state of the active steering influence system caused by the signal instruction is to the extent and/or in the way that correlates with the intensity and/or the type of the deceleration.

11. The control unit of claim 9, wherein the active steering influence system, as the active steering damper, is configured for variably influencing the damping properties with respect to the relative motion between the wheel suspension of the front wheel and the frame of the motorcycle.

12. The control unit of claim 9, wherein the driver assistance system implements at least one of the adaptive cruise control, the pre-collision brake assist, and the automatic emergency braking system.

13. The method of claim 8, wherein the longitudinal acceleration is effectuated by the brake application at the front wheel and/or at the rear wheel, and the active modification of the state of the active steering influence system caused by the signal instruction is to the extent and/or in the way that correlates with the intensity and/or the type of the deceleration.

14. The method of claim 8, wherein the active steering influence system, as the active steering damper, is configured for variably influencing the damping properties with respect to the relative motion between the wheel suspension of the front wheel and the frame of the motorcycle.

15. The method of claim 8, wherein the driver assistance system implements at least one of the adaptive cruise control, the pre-collision brake assist, and the automatic emergency braking system.

* * * * *